(12) United States Patent
Crettenand

(10) Patent No.: US 8,333,881 B2
(45) Date of Patent: Dec. 18, 2012

(54) ELECTROCHEMICAL REACTOR

(75) Inventor: David Crettenand, Riddes (CH)

(73) Assignee: RedElec Technologie SA, Monthey (CH)

(*) Notice: Subject to any disclaimer, the term of this patent is extended or adjusted under 35 U.S.C. 154(b) by 957 days.

(21) Appl. No.: 12/306,385

(22) PCT Filed: Jun. 12, 2007

(86) PCT No.: PCT/CH2007/000312
§ 371 (c)(1), (2), (4) Date: Dec. 23, 2008

(87) PCT Pub. No.: WO2007/147283
PCT Pub. Date: Dec. 27, 2007

(65) Prior Publication Data
US 2009/0308757 A1   Dec. 17, 2009

(30) Foreign Application Priority Data
Jun. 23, 2006  (EP) ..................................... 06012925

(51) Int. Cl.
C25B 11/02 (2006.01)

(52) U.S. Cl. ..... 205/348; 204/237; 204/252; 204/278.5; 205/347

(58) Field of Classification Search .................. 205/352, 205/348
See application file for complete search history.

(56) References Cited

U.S. PATENT DOCUMENTS
3,716,459 A * 2/1973 Salter et al. .................... 205/703
(Continued)

FOREIGN PATENT DOCUMENTS
GB       1 239 983 A    7/1971
(Continued)

OTHER PUBLICATIONS

"Electrochemical Reduction of Indigo in Fixed and Fluidized Beds of Graphite Granules" by Roessler et al., J. Appl. Electrochem. 33, pp. 901-908 (2003).*
Albert Roessler, et al., "Direct electrochemical reduction of vat dyes in fixed bed of graphite granules", Dyes and Pigments, 2004, pp. 29-37, vol. 63, No. 1, XP004510045, Elsevier Applied Science Publishers, Barking, GB.

(Continued)

Primary Examiner — Harry D Wilkins, III
Assistant Examiner — Bryan D. Ripa
(74) Attorney, Agent, or Firm — Sughrue Mion, PLLC

(57) ABSTRACT

The disclosure pertains to an electrochemical reactor (1, 13), in particular but not exclusively for vatting sulphur dye or vat dye as well as to methods of using such a reactor and to uses of such a reactor. The electrochemical reactor comprises at least one liquid compartment (3) in which a multitude of freely suspended granules (14) is enclosed, wherein at least one of the side walls (5) of the compartment is an electrode and an opposite side wall is formed by a separator element (6), typically a membrane (6), wherein there is provided a bottom inlet (7, 9) and a top outlet (8, 10) of the compartment for a liquid catholyte (9) or a liquid anolyte (7), wherein the inlet region as well as the outlet region of the compartment (3) are provided with an upper grid (11') and a lower grid (11"), the width of the mesh and the positioning of which is chosen such as to allow the liquid catholyte (9) or the liquid anolyte (7) to pass through from bottom to top but to prevent the granules (14) to pass through the grids (11',11") to leave the compartment (3), and wherein the upstream flow of the liquid catholyte (9) or of the liquid anolyte (7) can be adjusted so that in operation the multitude of granules (14) is dragged against the upper grid (11') while the lower grid (11") is substantially not in contact with the granules (14).

23 Claims, 7 Drawing Sheets

U.S. PATENT DOCUMENTS

| | | | |
|---|---|---|---|
| 3,966,571 A | | 6/1976 | Gagnon et al. |
| 4,022,678 A | * | 5/1977 | Wojcik et al. ............. 204/273 |
| 4,626,331 A | | 12/1986 | Goto et al. |
| 4,921,587 A | | 5/1990 | Dong et al. |

FOREIGN PATENT DOCUMENTS

| | | |
|---|---|---|
| WO | 90/15182 A1 | 12/1990 |
| WO | 94/23114 A1 | 10/1994 |
| WO | 00/31334 A2 | 6/2000 |
| WO | 01/46497 A2 | 6/2001 |

OTHER PUBLICATIONS

C. Belmant, et al., "Application of an electrochemical pulsed flow reactor to electroorganic synthesis: Part I: Reduction of acetophenone", Journal of Applied Electrochemistry, 1998, pp. 185-191, vol. 28, No. 2, XP-000785699.

Kamalnayan Kantilal Patel, et al., "Numerical simulation of porous networks in relation to battery electrodes and separators", Journal of Power Sources, Jul. 2003, pp. 144-152, vol. 122, No. 2, XP004437056, Elsevier.

* cited by examiner

ELECTROCHEMICAL REACTOR

CROSS REFERENCE TO RELATED APPLICATION

This application is a National Stage of International Application No. PCT/CH2007/000312 filed Jun. 22, 2007, claiming priority based on European Patent Application No. 06 012 925.1, filed Jun. 23, 2006, the contents of all of which are incorporated herein by reference in their entirety.

TECHNICAL FIELD

The disclosure pertains to the field of electrochemical reactors, in particular, but not exclusively, for the vatting of sulphur dye or vat dye as well as to methods of using such a reactor and to uses of such a reactor.

BACKGROUND OF THE INVENTION

The use of vat and sulfur dyes for printing and colouring of textile fibres has until now been associated with the application of over-stoichiometric reduction-agent amounts (relative to the dye amount to be reduced). The reduction of the vat dyes conventionally takes place in alkaline (pH>9), aqueous solutions with sodium dithionite (hydrosulfite) or reduction agents derived therefrom (e.g. RONGALIT C, BASF) in conjunction with wetting agents and complexing agents.

The reduction agents suitable for reduction of vat dyes have a redox potential, under the conditions necessary for the vatting of the dyes, of −400 mV to −1000 mV. Both the application of hydrosulfite and of thiourea dioxide lead to a high sulfite or sulfate loading of the effluent. These salt loads are on the one hand toxic, and on the other hand are corrosive and lead to the destruction of concrete conduits etc.. A further problem of the sulfate load in the effluent arising from the sulfite is the hydrogen sulfide formation in the sewer system pipes, caused by anaerobic organisms.

Likewise, newer methods could only partially solve the problems mentioned. Here, the reduction using ultrasound reactors in conjunction with the conventional reduction agents is worthy of mention. This method offers the advantage that the reduction-agent consumption is lowered to stoichiometric proportions and that the hydrosulfite can be replaced with endiols. A known electrochemical method uses hydrosulfite, from which additional, dye-reducing reaction products arise, leading to a lowering of the hydrosulfite amount necessary for the vatting of the dye.

In addition, known from WO 90/15182 is a method in which an electrochemical vatting is carried out with the aid of a mediator. The mediators are reversible redox systems such as iron (II/III) complexes that reduce the dye and are constantly regenerated at the cathode. Based on the high use amounts and the ecological seriousness of such mediators, there exists as before an acute environmental problem that can only be solved through additional investments in an adequate wastewater technology or through a recycling process. A further disadvantage of this method is the perpetual additional mediator feeds necessary for maintenance of the redox cycle in the continuous dyeing technology. The additional dosing of the mediator system results from liquor discharge proportional to the fabric- or yarn-flow.

The mentioned problems led to a new solution approach that in essence permitted a reduction-agent free vatting of the dye. In WO 00/31334 e.g., an electrochemical reduction is proposed that, proceeding from different start mechanisms, requires no additional reduction agent during the continuous operational mode of the reactor.

The mentioned electrochemical methods (WO 90/15182 and WO 00/31334) have a common disadvantage in the limited specific reactor power, for the increase of which very large electrode surfaces must be provided.

A current approach is described in WO 94/23114, in which a leucoindigo produced through catalytic hydrogenation is used for dyeing of cellulose-containing textiles material and the portion of the leucoindigo in the dye liquor oxidized through air contact during the dyeing is electrochemically reduced with the application of a mediator system. The dyeing, after the absorption of the leucoindigo into the textile material, takes place in a conventional manner. Thus, this method is likewise afflicted with the above-mentioned disadvantages of the mediator technique.

The use, as in the prior art, of solubilizing agents necessary for a quick vatting with high conversion factors and, in particular, the application of ultrasound for generation of an essentially homogeneous and fine-grained distribution of the pigments would indeed lead to very large pressure losses and to clogging of the electrode formed as a filter.

The electrocatalytic hydrogenation of nickel or similar large-surface, conductive, catalytically active materials with low hydrogen overvoltage represents a method long known and is successfully used in the case of numerous organic compounds. Platinum, nickel, palladium, and rhodium are used for the hydrogenation of acetophenone, palladium in the case of alkenes and palladium as well as nickel for hydrogenation of nitrobenzene. Nickel surfaces are very often used for reasons of low costs and the relatively simple possibility of forming extremely large surfaces (Raney nickel). This electrode type is successfully applied in the electrocatalytic hydrogenation of unsaturated hydrocarbons such as polycyclic compounds, phenols, ketones, nitro compounds, nitrites, imines, etc..

In this, the cathode is used in different configurations. Conductive metal (plate or grid form) such as, for example, nickel or V2A steel can be covered with a likewise metallic, porous film, e.g. nickel black, in which particles of Raney nickel-aluminum alloy or Raney copper-aluminum alloy can be embedded. In the case of application of not-yet-active Raney catalyst, the activation must be carried out through an appropriate pretreatment. In addition, it is possible to use polytetrafluorethylene (PTFE) as a binder for the catalyst particles (e.g. noble metal) on a metallic substrate.

Direct electrochemical reduction of indigo via the indigo radical has been proposed as an alternative to mediated electrochemical reduction, for vat and sulphur dyes has been described which does not require the permanent presence of a redox mediator. It is based on a reaction mechanism in which a radical anion is formed by a comproportionation reaction between the dye and the leuco dye, followed by the electrochemical reduction of this radical. The leuco dye, acting as an electron-shuttle between the electrode and the surface of the dye pigment, has to be generated first in small quantity to initiate reduction. For future industrial application of the direct electrochemical reduction of vat dyes, the reduction rate has to be increased considerably. All experimental data are in agreement with a diffusion-controlled reduction of the intermediate radical anion being the rate-limiting step of this electrochemical process. Because this limiting rate is critically depending on the thickness of the diffusion layer at the electrode surface, an increase of the catholyte flow could enhance significantly the reduction rate. Until now, however, reactor performance even for bath-stabilization is still too low.

Electrocatalytic hydrogenation is a recently introduced reduction method for vat and sulphur dyes and it proves to be a promising and attractive alternative in terms of economic and ecological aspects (see e.g. WO 01/46497). The process consists of a sequence of reduction steps which differ principally from those of the previously described indirect and direct electrochemical vatting processes via the dye radical. These involve electron-transfer from the cathode to either a mediator or the leuco radical anion of the vat dye. In contrast to this mechanism, electrochemical hydrogenation is a process in which adsorbed hydrogen, produced in situ by electrolysis of water, reacts with adsorbed organic substrates (i.e. vat dye) at the electrode surface. The hydrogenation step is in competition with hydrogen evolution reaction and the efficiency of the electrocatalytic hydrogenation is determined by this competition. The industrial feasibility of this novel route has been studied recently in a divided flow cell using Raney-nickel electrodes. Several vat dyes could be reduced with this method. In case of indigo it was tried to establish optimised conditions in the system, and a scale-up in indigo concentration to 10 g/l was achieved. Unfortunately, using the optimised conditions, only a low current efficiency of 12.7% could be reached at 95% conversion. Thus, a huge electrode surface of more than several hundreds square meters would be necessary to attain an industrially feasible reduction rate for stock solutions. Probably the method will be only powerful enough for dye bath stabilization. Nevertheless, Raney nickel was chosen as electrode material, because it is interesting from the standpoint of availability, costs and stability in alkaline medium. The stability of platinum-black electrodes— which are among the most active ones—was shown to be poor, so that their industrial application is impossible. However, on the basis of these results, it should be possible to improve the efficiency of the process by using a different reactor design based on the intensification of the contact between the dye particles and the electrode. For this purpose the so-called precoat-layer-cell has been developed. The reactor is based on the filtration principle, i.e. by bringing the indigo into contact with a cathode, where the cathode is formed by a support of an electrically conductive material (i.e. filter fabrics) and a cathodically polarized layer (i.e. Raney nickel) formed on the filter in situ by precoat filtration. The severe drawback of this technique seems to be the big pressure drop built up during the filtration process and the persistent danger of blocking the reactor. In addition, the reactor performance is low.

In accordance with the above mentioned problems, noble metal particles supported on graphite granules have also been investigated as electrode material in a fixed- and fluidised bed reactor. The pressure drop over the granular material was much lower than in case of fine Raney nickel powder and it was still possible to end up in fair and good electrogenolysis efficiencies. However, noble metals are very expensive and the long-time behaviour of the catalyst is poor.

Carbons and graphite are high-surface-area materials and are therefore extensively used in electrochemistry. Even for the reduction of indigo these materials have been applied using a specially prepared cathode of finely divided indigo and graphite powder in a solution of sodium carbonate. Recently, it has been shown that graphite granules can act as electrode material for the direct electrochemical reduction of indigo in aqueous suspension. Optimised conditions were sought and a scale-up in indigo concentration to 10 g/l was achieved (Roessler A, Crettenand D, Dossenbach O, Rys P. J Appl Electrochem, 33:901-908, 2003). Due to the high hydrogen overvoltage on graphite under the applied conditions, no chemisorption or only very weak chemisorption of hydrogen is possible. Therefore, a normal electron transfer seems to be the relevant process for the reduction of indigo. Unfortunately, the reduction rate is rather low. Therefore, a great deal of work has focussed on the acceleration of the process. Until now, it is possible to reduce an extensive range of vat dye (i.e. indanthrene dyes) and indigo suspensions up to 100 g/l without a blocking of the reactor. For example, in case of indigo the investigations end up in fair and good values of approximately 60% current efficiency, 1 kWh/kg power consumption and a reduction rate of 10 mg/min kg graphite (at 50° C.). Thus, this process can compete with the mediator technique from an economic point of view. Probably, the installation costs for the reactor are also lower. In addition, a recycling of the mediator by ultra- and nanofiltration is not required.

GB 1239983 discloses an electrochemical process in which a bed of particles is flown through by an electrolyte fluid. These discrete particles are electrically conductive and the electrolyte solution or fluid flow is carried out such as to always impart movement to the particles. The particles are limited in their upward movement by a particle-impermeable barrier positioned above the particle bed. The particle movement is important since the aim is that the volume occupied by the moving particles is less than the natural volume which the particles would occupy as a fluidised bed in the absence of the impermeable barrier. This means that the flow of the fluid is essentially kept just above the minimum as determined by the Stokes equation for carrying the particles against this barrier. A problem with this approach is the fact that the conductivity of the fluidized bed is low, making it unsuitable for example for the vatting of sulfur dyes or vat dyes (e.g. indigo).

A different approach is chosen in U.S. Pat. No. 3,966,571, which discloses a system and a method for high rate electrochemical reactions involving an electrode of loose conductive particles packed together by rapid electrolyte flow. In this disclosure a bed of conductive particles is dynamically packed against the screen and maintained in contact with a screen type current collector by a rapid flow of electrolyte through the chamber. In order to have an as compact bed as possible, a complicated sequence of pack and unpack cycles is carried out until only after that the electrolytic process is started. While this highly compact bed leads to a large conductivity of the electrode, rather large particles must be used (average particle diameter of 1 mm) in order to have a sufficient flow, which however cannot avoid a significantly high pressure-loss across the compacted fixed bed. This leads to a low reaction surface and a rather inefficient electrolytic process and makes the proposed process essentially unsuitable for the vatting of indigo.

SUMMARY OF THE INVENTION

It is therefore one of the objects of the present invention to not only provide an improvement of the above discussed methods for the dyeing of textiles, but more generally to provide an improved electrochemical reactor which has a high efficiency, a high throughput, is easy to maintain and which can be incorporated easily into existing set-ups for oxidative or reductive processes.

An electrochemical reactor is thus proposed comprising at least one liquid compartment in which a multitude of freely suspended conductive granules is enclosed. At least one of the side walls of the compartment is an electrode and an opposite side wall is formed by a separator element (i.e. e.g. a membrane and/or a grid). There is provided a bottom inlet and a top outlet of the compartment for a liquid catholyte or a liquid anolyte, so the liquid substantially flows from bottom to top in upstream motion. The inlet region as well as the outlet region of the compartment are provided with an upper grid and a lower grid, the width of the mesh and the positioning of which is chosen such as to allow the liquid catholyte or the liquid anolyte to pass through from bottom to top but to prevent the granules to pass through the grids to leave the compartment. It is noted that the above definition of the granules to be freely suspended means that the granules are not restricted in their motion by the two grids as long as there is no flow of the liquid. So the proposed structure is not a so-called fixed bed, in which the conductive particles are fixed in space, but rather a dragged bed. This means that the upstream flow of the liquid catholyte or of the liquid anolyte can be adjusted so that in operation the multitude of granules is transported against gravity acting on the granules against the upper grid while the lower grid in this situation (so when the flow is strong enough to drag the particles or granules completely onto the upper grid) is substantially not in contact with the granules.

So in contrast to a fixed bed reactor, in which particles are tightly and compactly packed between two grids, in the proposed set up the particles are intentionally loosely located between two grids such that in operation they are dragged or pressed against the upper grid, while without flow of the liquid they are moved downwards onto the lower grid by gravity. The proposed reactor is also in contrast to a so-called fluidised bed reactor, in which there is a bed of particles through which a liquid flows from bottom to top, but in which there is no upper grid, and in which the liquid flow is always adjusted such that the dragging effect by the liquid is substantially smaller than the gravitational effect onto the particles, such that the particles are substantially always lying on the lower grid.

One of the key feature of the invention is therefore the fact that since the particles or granules are dragged against the upper grid they can optimally pack against the electrically neutral upper grid to provide a high porosity of the bed and thus present an ideal combination of low pressure drop when liquid flows through them and an optimally high surface area for efficient electrochemical reaction, and optimally high contact between the individual particles due to contact and friction between the particles. Optimally pack in the sense of this invention does not mean that the particles are rearranging to find the most compact arrangement, but it means that the particles are packed in a stable and close contact relative arrangement such that on the one hand one obtains the desired high conductivity, high reaction surface and at the same time the high porosity to allow a high throughput of electrolyte and a high rate of reaction. The high porosity is also particularly important if the electrolyte has a rather high viscosity, which for example in the case of the vatting of dyes like e.g. indigo can be a critical issue.

In a first preferred embodiment of the present invention, the granules have an average particle size diameter of less than or equal to 0.5 mm, preferably between 0.2-0.5 mm, even more preferably an average particle size diameter in the range of 300-400 micrometer, but preferably all the particles have diameters larger than 5 micrometer. Indeed if the granules are chosen to be too small, generally the particles dragged against the upper grid have a tendency to completely block the liquid throughput through the reactor, and if the granules are chosen to be too large, they will not be dragged against the upper grid or the electrochemical efficiency is too low, and the advantageous effects will not take place.

According to a further preferred embodiment of the present invention, the granules have a size distribution such that the full width at half height (fwfh) is in the range of 50-100 micrometer, wherein preferably there is no granules below or equal 5 micrometer. Preferably the granules are essentially non-spherical for high porosity of the dragged bed. In order to be able to retain the granules of that sizes, it is advantageous to let the at least one, preferably both grids have a mesh width below or equal to 200 micrometer, preferably a mesh width in the range of 50-150 micrometer. The grids can be polyester open mesh fabrics or other plastics materials.

In order to enable an efficient electrochemical reaction, preferably the granules are activated carbon, coke and/or graphite granules, which are optionally provided with a surface treatment (e.g. for increasing electrical conductivity or chemical reactivity of the surface). It is also possible to use different common electrode materials, like metal particles and granulates of conducting polymers In order to make sure that indeed the granules are freely suspended, it is preferred that the volume between the two grids is at least 10% larger than the volume of the total of the multitude of granules enclosed by the two grids in substantially dense packing, preferably at least 25% larger, even more preferably at least 40% larger.

Optimum conditions can be established if the distance between the electrode wall and the separator element, so typically the membrane wall of the compartment is in the range of 0.5-5 cm, preferably in the range of 0.5-1.5 cm and/or if the compartment has a height of in the range of 10-60 cm.

As already mentioned, in the set-up normally both grids are electrically neutral so they do not form part of the electrode.

A specific preferred embodiment is given if the compartment is a cathodic compartment, wherein one of the side walls is a cathode plate and the opposite side wall is a separator element (i.e. membrane, grid) to an adjacent anodic compartment.

Preferably, the electrochemical reactor is given by a horizontal stack of the above reactors. So the electrochemical reactor preferably comprises at least two, preferably more than two cell units as defined above which are located adjacent to each other preferably with alternating polarity such that adjacent side walls of adjacent units comprising a cathodic compartment and an anodic compartment are forming common electrode plates for adjacent units.

Furthermore the present invention relates to a method using such a reactor for the oxidation or reduction of chemical components such a method being located in the pure chemical field but also in the biotechnological fields. The method for the reduction or oxidation of a component in a reactor in a continuous or quasi continuous process is characterised in that the upstream velocity of the liquid catholyte or the liquid anolyte carrying the component is chosen to be larger than a minimum fluid velocity ($v_m$) determined by the following equation:

$$v_m = [(\rho_s - \rho_f) g d_p^2]/\mu,$$

wherein $v_m$=minimum flow velocity, $\rho_s$=density of the granulate, $\rho_f$=density of the fluid, g=acceleration due to gravity, $d_p$=mean particle diameter, $\mu$=fluid viscosity. If these conditions are maintained during operation, it can be made sure that indeed the particles or granules are dragged firmly against the upper grid.

A preferred application of this method is given if the component is a vat dye and/or a sulphur dye in aqueous solution, a bleaching component or a mediator for reduction.

As outlined above, in accordance with the present invention a dragged bed is desired, which is firmly packed against the upper grid, which however nevertheless is not fully compact. In order to avoid a compacting of the dragged bed during or prior to the operation, in accordance with a further embodiment of the invention the fluid velocity $v_m$ is adjusted such as to have laminar flow at least in the region of the channel before the fluid enters the dragged bed, wherein preferably this is achieved by choosing the fluid velocity to be $$v_m < 500 \, \mu P/S^*(\rho_f)[10(1-\epsilon)/\epsilon^3],$$

because the desired laminar fluid velocity $v_{mc}$ in the channel outside of the bed is given by:

$$v_{mc} < 500 \, \mu P/S^*(\rho f)$$

and $v_m$ and $v_{mc}$ are related as follows:

$$v_m = v_{mc}[10(1-\epsilon)/\epsilon^3].$$

The present invention furthermore relates to a method for the preparation of a dragged bed subsequently to be operated in accordance with a method as given above. This method essentially makes sure that the particles are dragged against the upper grid in a way such that compacting of the bed is essentially avoided. In accordance with this method, in a first step the fluid velocity of the electrolyte is increased up to or above the minimum flow in accordance with the Stokes equation but preferably not more than twice the minimum of the Stokes equation, this at least until the freely suspended conductive granules are dragged against the upper grid. In a second step the flow velocity is then increased to a minimum value of in the range of $$v_m = [(\rho_s - \rho_f)g d_p^2]/\mu,$$

preferably up to but not including a value of $$v_m < 500 \, \mu P/S^*(\rho_f)[10(1-\epsilon)/\epsilon^3].$$

Preferably to this end the flow in the channel upstream of the dragged bed, i.e. $v_{mc}$, is increased by 0.001-0.05 cm/s per second, preferably 0.005-0.02 cm/s per second. In a third step the actual electrolytic process is started (before that no electric current should preferably be allowed to flow), wherein the variation in the flow velocity is then preferably kept low, such as to avoid a rearrangement of the dragged bed leading to a compacting of the dragged bed.

Furthermore, the present invention relates to the use of a reactor as given above, preferably in combination with a method as given above for vat and/or sulphur dye dyeing of fibres, yarns and/or textiles wherein the reactor is used for the preparation of a bleaching agent and/or for the reduction of the dye and/or for the stabilization of the dyebath against the oxidation with the help of a mediator system and/or for oxidation of the dye after its application to the fibres, yarns and/or textiles, wherein preferably two distinct reactors are used, one for the preparation of a bleaching agent and for the oxidation of the dye after its application to the fibres, and a second one for the reduction of the dye.

Further embodiments of the present invention are outlined in the dependent claims.

So to sum up the invention concerns an new electrode configuration for an electrochemical reactor: a dragged bed electrode, which is made up of a conductive granular material and a conductive plate. The granular material builds a high porosity bed dragged by the electrolyte stream in a flow against gravity. The bed is maintained in the reactor by a non-conductive net and is in contact with a conductive plate that brings the electric current to the granulated material. This electrode has a high specific surface area furthering to a high speed of reduction and has a high porosity allowing to avoid the blocking of the reactor. It is particularly adapted to reduce the suspension of organic compounds (e.g. vat dyes and sulfur dye) or gases (e.g. oxygen) because this morphology allows to bring the compounds to reduce in close contact with the electrode and at the same time to minimize the pressure drop through the reactor. In the invention a dyeing equipment is proposed further below allowing the bleaching of cellulose fibres, their coloration with vat dye or sulfur dye and the re-oxidation of the stuff on one dyeing machine alone using the electrochemical reactor equipped with a dragged bed of carbon particles. The reactor builds hydrogen peroxide in an alkali medium used for bleaching of the substrates to dye, the reduction of the vat dyes or sulfur dye, and the stabilization of the dye bath by reduction of a mediator present in low concentration in it and the hydrogen peroxide formation essential for the oxidation and fixation of the dye on the substrate after the bath exhaustion.

The use of an electrode being made up of granular material is as such known. Electrochemical reactors with fixed or fluidised beds can be found in the literature. The proposed dragged bed however is a new and unexpectedly efficient invention. The invention allows working with an electrode composed by granulate of small diameter (<0.5 mm). That is not possible in a fixed bed because the pressure drop through the reactor would be too high fur such a size of the granules and that limits the specific surface area of the electrode and its performances. A fluidised bed induces a loss in the conductivity of the bed, that will also limit its performances and more, the loss in pressure drop in a fluidised bed is a lot higher than in a dragged bed.

SHORT DESCRIPTION OF THE FIGURES

In the accompanying drawings preferred embodiments of the invention are shown in which:

FIG. 1 a) is a detailed cut through a basic unit of an electrochemical reactor; b) is a stack of five such basic units;

DETAILED DESCRIPTION OF THE PREFERRED EMBODIMENTS

Figure 1:
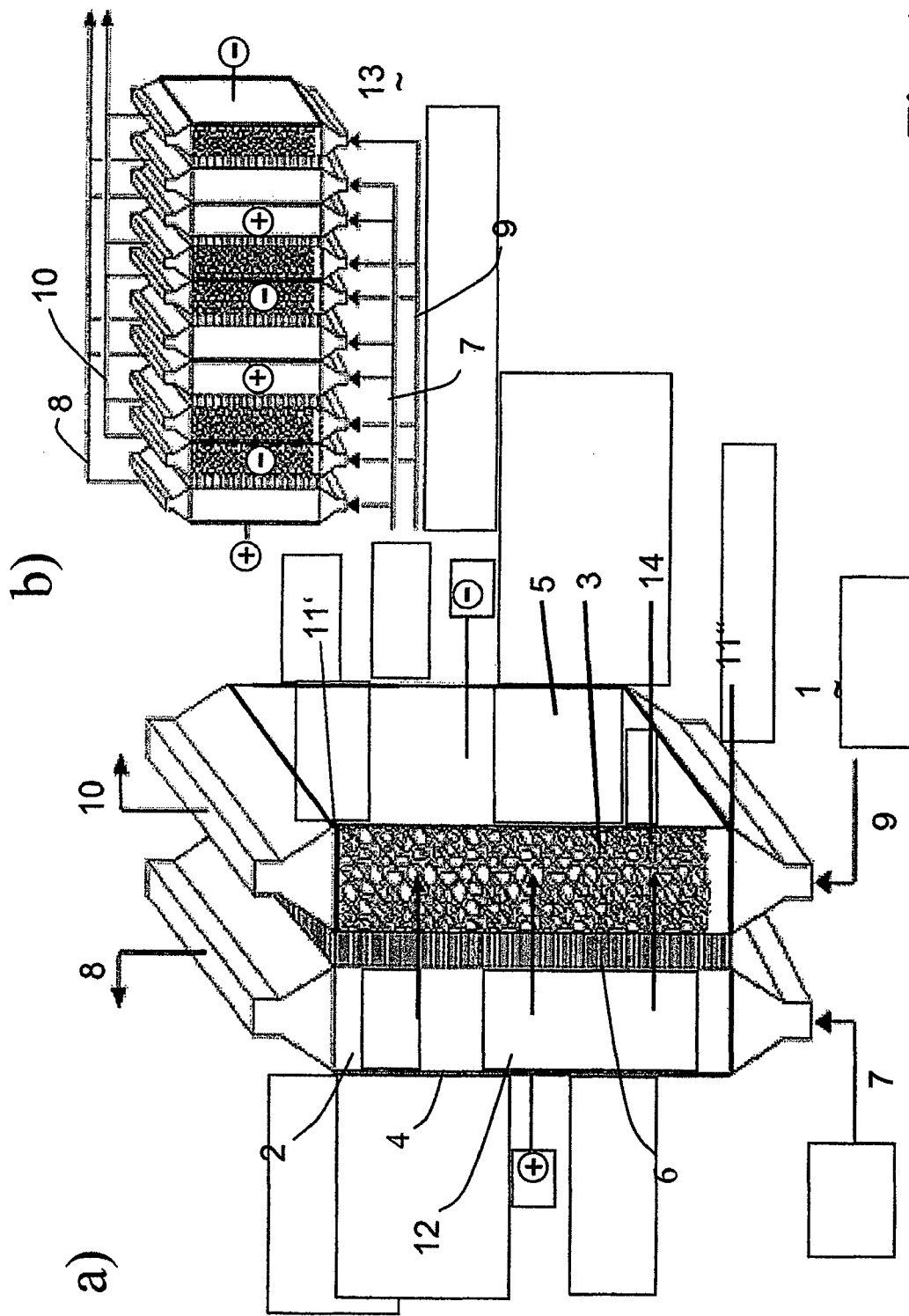

Referring to the drawings, which are for the purpose of illustrating the present preferred embodiments of the invention and not for the purpose of limiting the same, the electrochemical cell with dragged bed electrode will be illustrated in more detail.

The invention concerns an electrochemical reactor, containing at least one porous electrode in the shape of a conductive granular material. The main principle that explains the use of an electrode composed by a granular material in order to obtain a high specific surface area is mentioned in the literature. The reactors using this principle can be divided in two distinct categories, the fixed bed electrodes and the fluidised bed electrodes.

Nevertheless, till today, none of these reactors can work with particles having a diameter under 0.5 mm without causing an intolerably big pressure drop during the passage of the electrolyte or without causing a diminution in the conductivity in the bed and a correspondingly low oxidative or reductive efficiency. This limits the performances of the reactor because its effectiveness depends on the specific surface area of the electrode, which increases with a diminution of the size of the particles forming the electrode.

The invention proposes a new structure of the bed constituting the electrode because this one is dragged by a stream of electrolyte in an opposite way to gravity and is "locked" in the reactor by a non-conductive grid, the mesh opening of which is below the size of the particles in the bed. This structure allows to obtain a higher porosity of the bed and so a smaller pressure drop than for a fixed or a fluidised bed made of the same sizes particles. Many geometrical shapes of the reactor can be thought in order to obtain a dragged bed electrode.

The cellular structure of the plate-and-frame filter press is the simplest for this application. The flexibility of this kind of reactors is interesting because it is very easy to build a reactor with many electrodes in a staple or stack and also choosing the desired thickness of the electrode compartment. The general direction of the electrolyte flow is perpendicular to the electrical stream. This configuration allows a reordering of the cells for an optimal use of the volume. More, the simple geometry of the reactor limits the problems when the size of the reactor is increased to make a pre-industrial or industrial reactor (scale-up). Last but not least, it is very easy to change the material of the electrode according to the application.

FIG. 1a) shows a possible structure of a filter press reactor. The electrochemical reactor 1 comprises an anodic compartment 2 and an adjacent cathodic compartment 3. Between the two compartments there is provided a membrane 6, typically a Nafion membrane. The wall opposite to the membrane 6 of the anodic compartment 2 is given by the anode plate 4, and the wall opposite to the membrane of the cathodic compartment is given by the cathode plate 5. Correspondingly, the electrical current flows as indicated by the arrow 12.

The anodic compartment 2 on its bottom comprises an inlet 7 for the anolyte and on its top it comprises an outlet 8 for the anolyte. Analogously, the cathodic compartment 3 on its bottom comprises an inlet 9 for catholyte and on its top end an outlet 10 for catholyte. Close to the outlet as well as to the inlet the compartment 3 is provided with grids, namely with an upper grid 11' and a lower grid 11". Since the flow of the liquid is substantially vertical, these grids are preferably located substantially horizontally. They however need not be flat, they may also have a three-dimensional structure like for example a zigzag or wavy shape. The bed of granules 14 is maintained in the reactor by such non-conductive grids set on the top and the bottom of the cell and is in contact with a conductive plate 5 that brings the electrical current into the granular material 14.

In the cathodic compartment 3 there is provided a bed in the form of a multitude of granules, these granules however not filling up the space between the two grids 11', 11" completely. The situation indicated in FIG. 1a) displays the conditions if the flow of the liquid is adjusted such that the granules are dragged against the upper grid 11', and such that there is free space without granules between the lower grid 11" and the lowermost granules.

If such a reactor is used for the reduction of a vat dye, the colorant will enter via the inlet 9, and it will leave the reactor in reduced state and ready for application to a textile via the outlet 10. In the corresponding process in the anodic compartment 2 oxygen will be produced.

As indicated in FIG. 1b) units as given in FIG. 1a) can be horizontally stacked in an efficient way if they are arranged adjacent to each other but with alternating polarity. They can then be efficiently connected as indicated by the inlet and outlet pathways in FIG. 1b).

Figure 2:
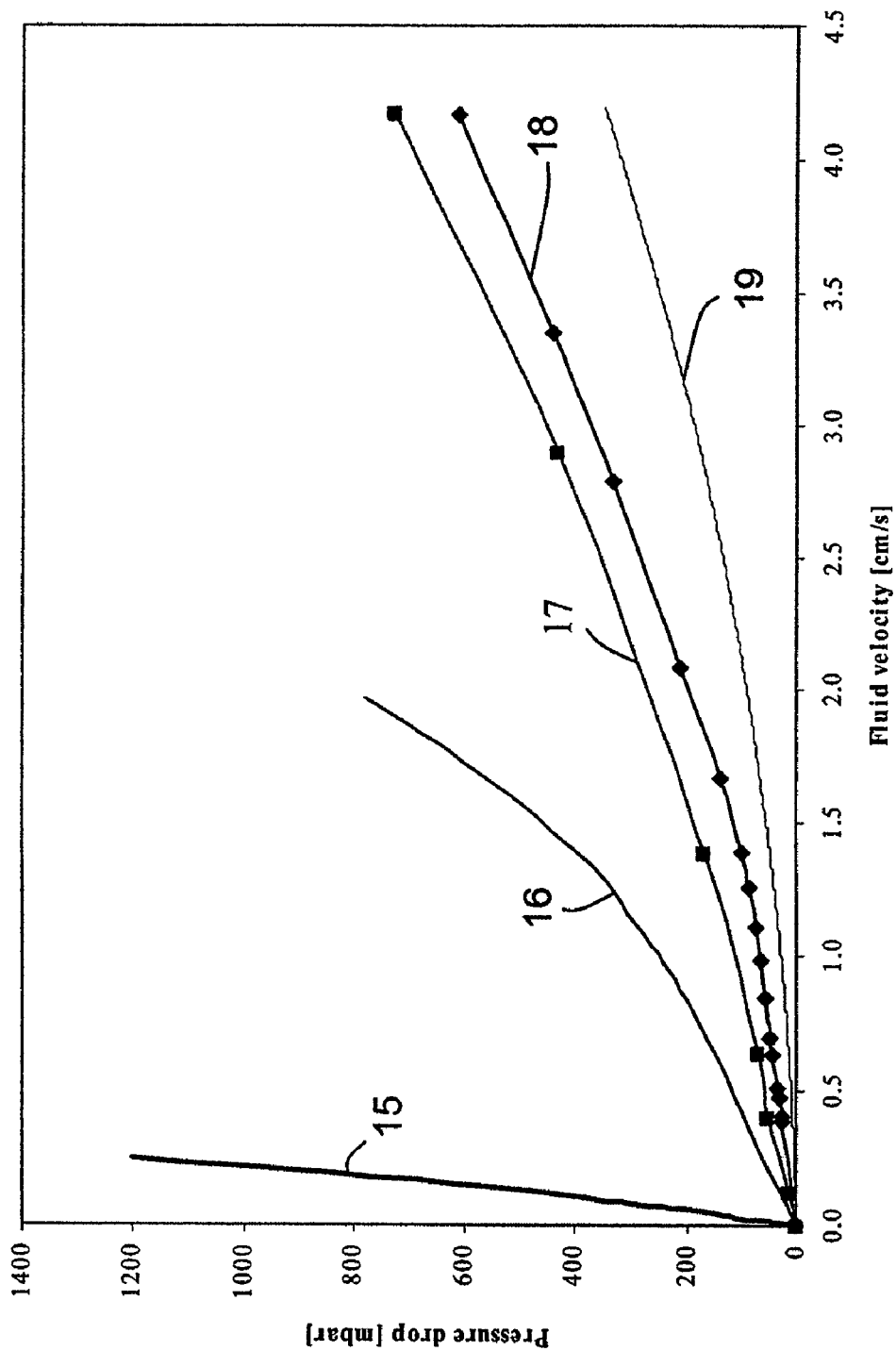
FIG. 2 shows a comparison of the pressure drop occurring in different systems.

The graphic in FIG. 2 shows the pressure drop when a bed of carbon particles is 10 cm high and when an electrolyte of NaOH 1M at 50° C. goes through it. It is obvious that for the same particle size, the pressure drop is clearly smaller in a dragged bed (17, 18, for a particle size of 0.32-1.16 mm and 0.50-0.40 mm, respectively) than in a fixed (16, for a particle size of 1.41-1.00 mm) or a flowing bed (15, for a particle size of 0.32-0.16 mm). The pressure drop is significantly smaller due to a high porosity of the dragged bed. In this system, the bed cannot reorganize itself in order to compact its particles in an ideal way. The dragged bed has a small compactness, because this kind of formation of the beds increases the emergence of vaults and empty pockets.

The defaults in compactness are maintained in the position by some kind of vaults that are the result of collective equilibrium in which a lot of particles are involved. The rubbing between the particles is important, because of the rugosity of the surface and shape of the particles. The rubbing is opposed to the move of rotation that will allow the particles to take a higher position. These vaults formed during the formation of the bed are difficult to be destroyed. The pressure applied on them by the liquid that goes through the bed has as a result to improve the stability of the vaults by pressing more around the particles constituting them. This pressure is ineffective to increase the compactness, but allows to increase the conductivity of the bed. In fact, the bad quality of the contact between the particles, related to the rugosity of the surface and the possible presence of an isolating layer around the particles, is improved by the pressure applied on the bed by the liquid that goes through it. Both effects favour the electrochemical process. Additionally, if one layer of agglomerated solid particles to reduce or insoluble impurities stays at the entrance of the bed or eventually in the middle of the bed, the system with the dragged bed is better. In fact, the diminution of the flow allows the collapse of this one and the release of solid particles.

Under certain conditions, it is also possible to obtain a bed with sufficient defaults of compactness with the liquid flowing from top to bottom. However, in this case, it is impossible to allows the collapse of the bed to release the solid particles.

The reactor is ideal for the reduction of suspensions. The large specific surface area given by the porous electrode is very attractive for a process permitting a small current exchange per surface unit. Additionally, this morphology allows to increase the coefficient of mass transfer, because it acts as a turbulence promoter for the electrolyte moving through the bed. The contact between particles in suspension and the granular material is optimal, and the pressure drop through the reactor remains moderate. The use of the electrode as a carbonated granular material permits to obtain good productivity per volume unit of the reactor for the reduction of vat dyes and sulfur dyes. The process can so be used for vatting operation in the process of coloration.

The configuration of the dragged bed electrode presents an interesting configuration to bring in contact a gas phase, a liquid phase (the electrolyte) and a solid phase (the electrode) in order to allow an electrochemical transformation. For example, it was demonstrated that oxygen could be transformed electrochemically into $H_2O_2$ on the same material as the one which is used for the reduction of coloration vat dyes and sulfur dyes.

Figure 3:
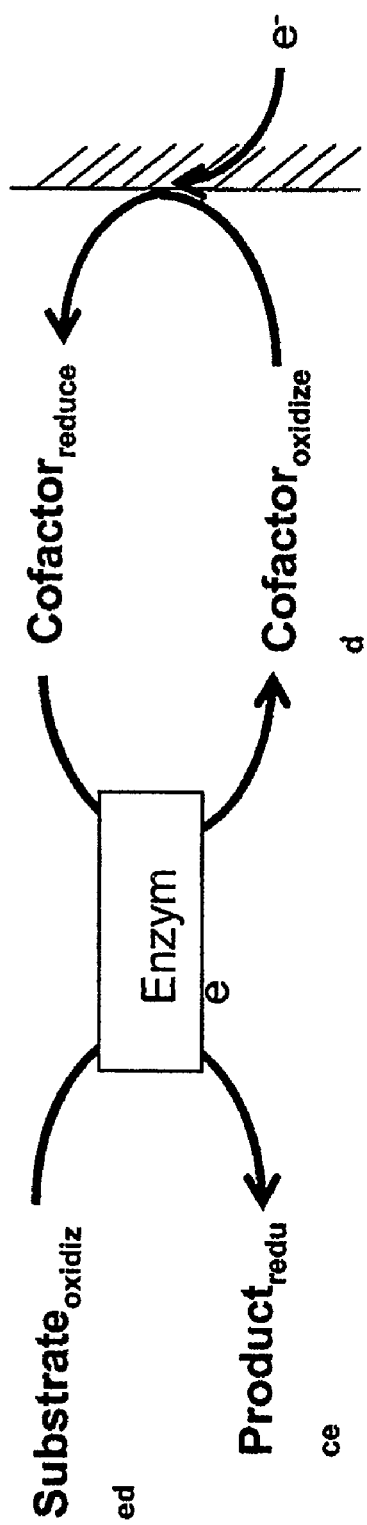
FIG. 3 shows a possible pathway for biotechnological applications.

The way to transform an electrochemically heterogeneous mixture with high performances is particularly interesting because of the possibility to avoid some separation processes. The invention allows electrochemical transformations in homogeneous electrolytes, suspensions, emulsions, foams, etc. The invention can find a lot of applications in the chemical industry (reduction or oxidation of organic and inorganic compounds), and also in the biotechnological industry, for example, for the regeneration of the cofactors according to the scheme as given in FIG. 3.

The invention permits to propose a new coloration system useful for the coloration processes with vat dyes (including indigo) and sulfur dyes. The present use of these dye categories is based on reduction to obtain the water-soluble form of the dye. In its reduced form, the dye has substantivity towards cellulosic fibres and, after absorption on the fibre, is reoxidised to the original water-insoluble form in situ in the fibre.

Figure 4:
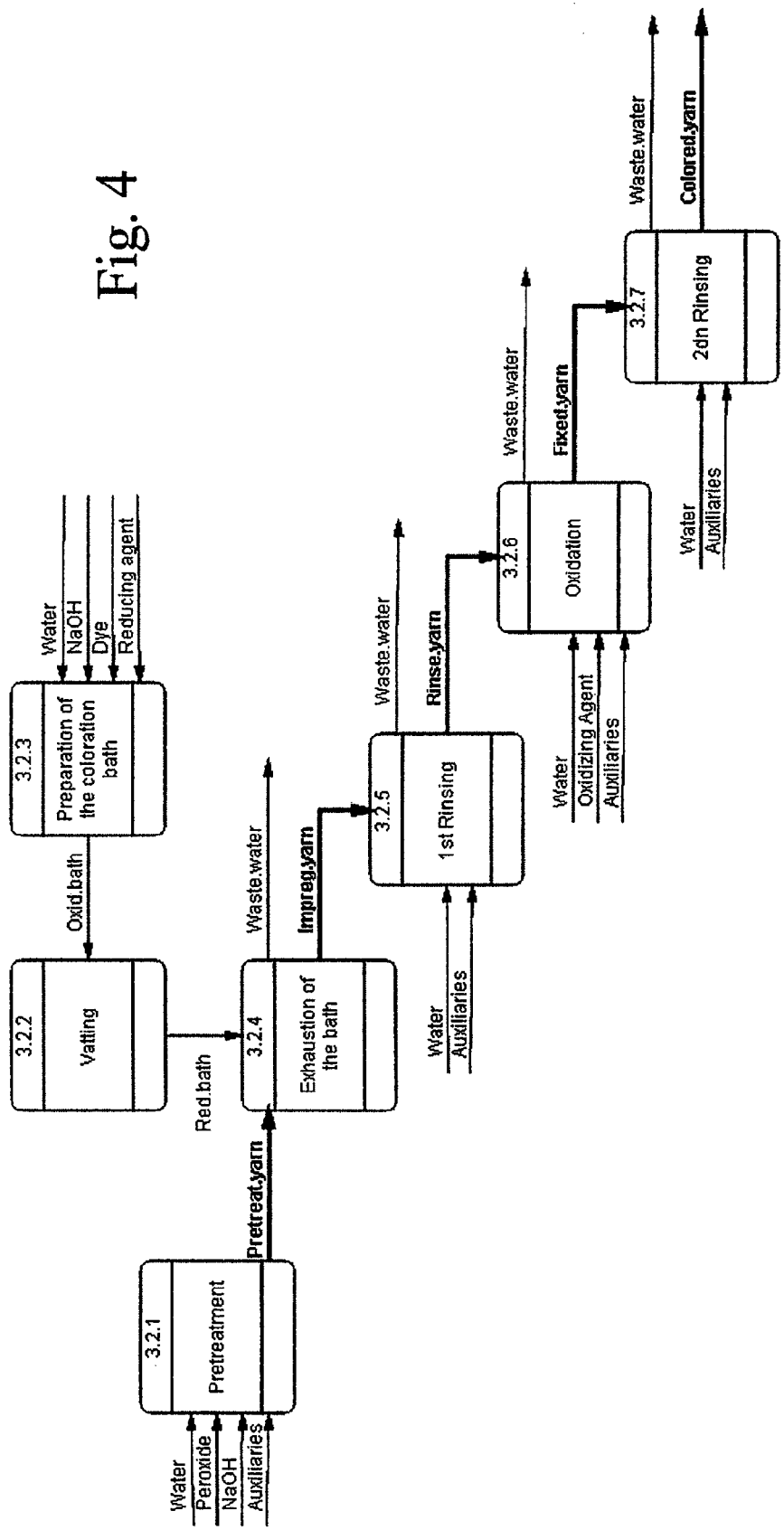
FIG. 4 shows a standard colouration process in a diagrammatic view in accordance with the state-of-the-art.

A standard coloration process is represented in the diagram in FIG. 4. The material to dye is prepared by boiling-off in the presence of alkali and an oxidative treatment with peroxide (3.2.1).

Prior to the dyeing operation the water-insoluble dye must be converted into the water-soluble substantive form. This is achieved by vatting with a reducing agent (3.2.3-3.2.2). In modern textile dyeing processes, the reduction of vat dyes is carried out using powerful reducing agents. The most used is sodium dithionite ($Na_2S_2O_4$). Unfortunately, the disposal of dye baths and rinse water causes problems, as already outlined above. In addition, as a result of the considerable excess of reducing agent required to stabilize oxidation-sensitive dye baths, the waste water may contain excess dithionite. In fact, the dye has always to be in the reductive form to avoid defaults in coloration.

The cellulosic textile is then entered into the dye bath and the dye exhausts out of it into the fibre (3.2.4). When the exhaustion process is complete, the dyeing is rinsed to remove loose dye and the residual reducing agent (3.2.5). The water-soluble form of the dye is the reconverted into its original form by oxidation. Today this is generally carried out with hydrogen peroxide (3.2.6).

After oxidation the dyeings are treated at boil in aqueous solution of a surfactant (soaping), rinse and dry.

The proposed system allows to produce the needed hydrogen peroxide for the pre-treatment (3.2.1) of the material to dye and for the reoxidation (3.2.6) of the dye after exhaustion, to prepare the coloration bath without reductive means (3.2.2 plus 3.2.3) and to stabilise this bath. It can be adapted to the different dyeing machines existing on the market.

Figure 5:
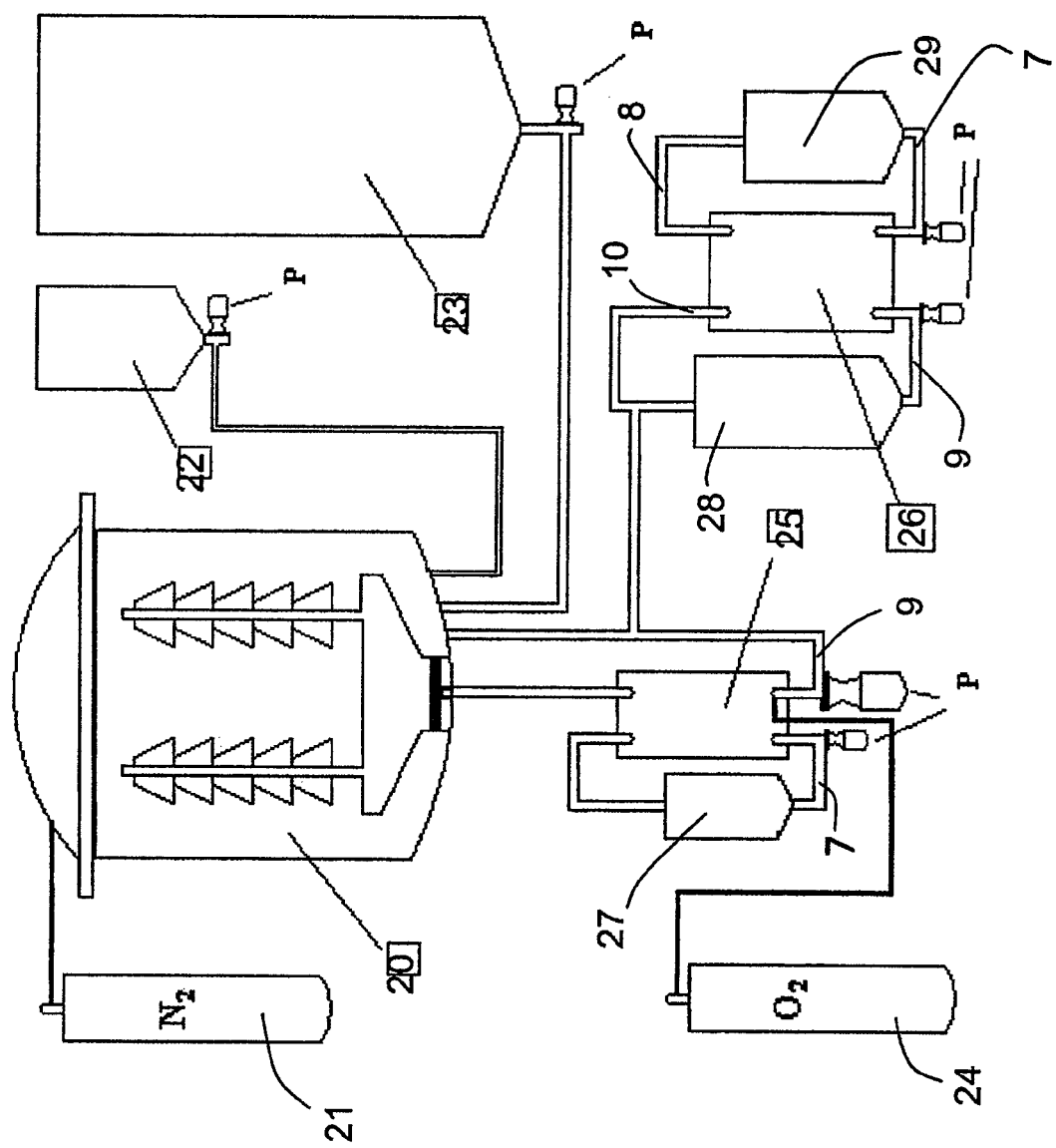
FIG. 5 shows a schematic view of a colouration set up with two reactors in accordance with the present invention, and FIGS. 6, 7 comparative measurements for comparison with methods of the state of the art.

The scheme indicated in FIG. 5 presents the concept for a cheese dyeing machine. A standard dyeing machine from the industry is commonly equipped with a tank for the preparation of the dye bath and with a smaller tank allowing the adjunction of chemical products during the coloration.

To this standard equipment can be added two electrochemical filter press reactors 25 and 26 with a dragged bed cathode of carbon particles (or graphite particles). The activity of this electrode material is connected with the presence of oxygenated functionalities on its surface. Particularly with quinone and hydroquinone groups, whether directly attached to the carbon surface or part of more complex structures. On this electrode, it is possible to produce $H_2O_2$ from the oxygen, to reduce vat or sulphur dye, and to reduce other organic compounds having quinone groups. We use this particularity to carry out different operations of the dyeing process with help of the electrochemical reactor equipped with a dragged bed cathode of carbon particles.

The bobbins of yarn are set in a dyeing machine 20 and an alkali solution prepared in the vat 23 is then inserted in the machine 20. This solution moves through the reactor 25 and constitutes the catholyte. The anolyte is provided via the tank 27, and is given by NaOH, 1M. Oxygen or air is inserted in the bottom of the reactor 25 allowing the formation in-situ of oxygen peroxide needed for bleaching the fibres. When the pre-treatment is finished, the bleaching solution is evacuated and a new alkali solution containing a mediator in small quantities is introduced into the dyeing machine.

This compound, which can be a soluble anthraquinone, is used to eliminate the oxygen present in the dyeing bath and to stabilise it during the dyeing process. The alkali solution moves through the electrochemical reactor 25 and the mediator is reduced. The chosen mediator has to have a more negative redox potential than the reduction potential of the dye. So in presence of the reduced mediator, the dye will be entirely in his reduced form. The mediator also allows eliminating the oxygen dissolved in the solution. The dyeing bath can be maintained under inert gas (e.g. nitrogen as provided by tank 21) in order to purge the oxygen and to reduce electrical consumption.

A dye suspension as provided in tank 28 (e.g. as a 100 g/l suspension in 1M NaOH) is reduced in a second electrochemical reactor 26 and a concentrated solution of reduced dye is produced. This solution is then introduced into the dyeing machine. In this case again the anolyte is provided via the tank 29 and is given by 1M NaOH. The possibility to dose the dye under its reduced state in the coloration bath allows a better quality of the coloration. The dyeing bath exhausted, is then evacuated from the machine. The bobbins of yarn are rinsed, then oxygen peroxide is produced again by oxygen reduction in the first electrochemical reactor 25 to allow the oxidation and the fixation of the dye on the fibres.

The process proposed allows an important reduction of the consumption of raw material and limits the cost of waste water treatment.

To obtain a dragged bed one should choose a minimum fluid velocity determined by the following equation:

$$v_m = [(\rho_s - \rho_f) g d_p^2]/\mu,$$

where $v_m$=minimum flow velocity, $\rho_s$=density of the granulate, $\rho_f$=density of the fluid, g=acceleration due to gravity, $d_p$=particle diameter, $\mu$=fluid viscosity. Choosing the flow velocity larger than or equal to the value as determined above makes sure that the gravitational effect on the particles is smaller than the dragging force exerted by the fluid flowing from bottom to top in the reactor.

It is to be noted that the above value of the minimum flow velocity $v_m$ is of course the flow velocity in the dragged bed, and its minimum value is actually 10 times the minimum velocity as calculated when using the Stokes equation. This minimum velocity allows a perfect stabilisation of the structure of the dragged bed.

This minimum flow velocity can be related to the velocity $v_{mc}$ of the liquid in the empty channel (or before entering the dragged bed) which can be more easily measured/controlled. It can be expressed as a function of the minimum flow velocity $v_m$ in the dragged bed as:

$$v_{mc} = [\epsilon^3/\{10(1-\epsilon)\}]^* v_m$$

wherein $\epsilon$ is the porosity of the dragged bed, this value $\epsilon$ being in the range of 0-1, e.g. a value of 0.6 meaning that 60% of the volume in the bed is occupied by the liquid and 40% by the particles.

Advantageously it is avoided that the particles in the dragged bed essentially don't rearrange during operation. To make sure that there is essentially no rearrangement during operation of the dragged bed the maximum velocity of the liquid in the empty channel should be adjusted such that there is laminar flow in the channel. To do so, the velocity $v_{mc}$ should be inferior to the value of the velocity when the flow starts to become non-laminar, so $$v_{mc} < 500 \, \mu P/S^*(\rho_f)$$

Wherein P is the circumference of the channel in meters, S is the cross-section of the channel in square meters and wherein, as above, μ is the fluid viscosity.

Correspondingly therefore preferably the velocity $v_{mc}$ of the flow of the liquid in the empty channel (or before the dragged bed) should be within the following boundaries:

$$[\epsilon^3/\{10(1-\epsilon)\}]*[(\rho_s-\rho_f)gd_p^2]/\mu \leq v_{mc} < 500 \, \mu P/S*(\rho_f)$$

Which in turn means that the flow velocity within the dragged bed should be within the following boundaries:

$$[(\rho_s-\rho_f)gd_p^2]/\mu \leq v_m < 500 \, \mu P/S*(\rho_f)[10(1-\epsilon)/\epsilon^3]$$

To give a numerical value for a dragged bed of carbon particles with a channel cross-section of 0.10×0.01 m, the carbon particles having a density $\rho_s$ of 2.30 g/cm³, the average diameter $d_p$ of the particles being 0.450*10⁻³ m, the fluid (1M NaOH of 50° C.) having a density $\rho_f$ of 1.03 g/m³ and a viscosity μ of 1.24*10⁻³ Pa·s, one gets a minimum value of the flow velocity of 4 cm/s, and an upper level not to be reached to avoid non-laminar flow of 14 cm/s.

It should be noted that following the Stokes equation a bed dragged against the upper grid is already formed at a flow velocity $v_m$ of 0.4 cm/s (a fluidized bed is already established at an even lower flow of e.g. 0.2 cm/s, which however is not sufficient to fully drag all the particles against the upper grid), at this flow however the conductivity, the stability and the reaction efficiency of the bed is far too low for operation according to the invention.

For the actual generation of the dragged bed according to the present invention the following procedure can be followed:

First a flow velocity of the electrolyte of between 0.4 and 1 cm/s is established, preferably between 0.4 and 0.6 cm/s. This leads to the establishment of a bed which is not compacted but which is dragged against the grid. Indeed when starting like that the bed is immediately carried upwards against the grid by the electrolyte liquid and this even before the bed is completely flown through by the liquid. The bed is then retained by the grid and immobilised. Then the liquid will flow fully through the bed.

Subsequently the flow velocity is slowly increased to the values according to the present invention. Slowly means that typically the flow is increased by 0.001-0.05 cm/s per second, preferably 0.005-0.02 cm/s per second. This until one reaches a value $v_{mc}$ in the above range, i.e. of at least 4 cm/s and below 14 cm/s, preferably between 4 cm/s and 8 cm/s.

Subsequently the actual electrolytic process is started, and care is to be taken that the variation in the flow velocity is kept low, such as to avoid a rearrangement of the dragged bed leading to an undesired compacting of the dragged bed.

As concerns the particles, these should have sizes in the range of 1-1000 micrometers, preferably between 50-500 micrometers. Furthermore in order to have a dragged bed of high porosity, it is advantageous if the particles are not fully spherical. Typically the sphericity of the particles should be in the range of 0.6-0.8. Indeed if the particles are almost spherical they can sometimes "automatically" rearrange to a dense packing leading to a low porosity typically in the range of 0.36-0.42. Using particles of the above sphericity a porosity of up to and even above 0.6 can be reached (meaning that 60% of the volume is taken by the liquid and 40% of the volume by the particles within the dragged bed). Therefore particles with a rough surface and of rather non-spherical general shape are preferred because they lead to a dragged bed with higher porosity under the above conditions. This type of particles promotes the formation of cavities, sometimes of rather large size, which are due to a stable collective relative arrangement of the particles in which arrangement several dozens of particles can be involved. Such arrangements are not as easily created if there is spherical particles.

EXAMPLES

The example 1 describes the construction of an electrochemical reactor, as well as the reduction of indigo in this reactor.

The reactor (Electro MP-cell, Electrocell AB, Sweden) consists of a combination of spacers and gaskets compressed between two end plates. As working electrode a flat nickel plate (10×10 cm) and a dragged bed of graphite granules (50 g) is used. The particle size of the graphite particles are between 0.7 and 0.05 mm, preferably between 0.5 and 0.2 mm. The anode is a nickel plate (10×10 cm). A commercially-available Nafion membrane (Nafion 324, DuPont) is used two separate the two compartments.

In a tank of 3 liters, 20 g of indigo are dispersed in 2 liters of water, which also contain 80 g of caustic soda pellets 100% purity. This catholyte solution is maintained under nitrogen atmosphere and is pumped through the cathode compartment. Placed on an another 3 liters tank are 2 liters of water containing 80 g of caustic soda. This anolyte solution is pumped through the anode compartment. Catholyte and anolyte solutions flow through the cathode and the anode compartment, vertically from bottom to top, with a flow velocity of 1 l/min.

The dye suspension is reduced by application of a cathode potential of −1000 mV vs. Ag/AgCl in 3 M KCl solution. The catholyte and anolyte solutions are maintained at 50° C. These reducing conditions are applied during 7 h and the indigo is completely reduced to the leuco dye with a current efficiency of about 95%.

The example 2 describes an electrochemical production of leuco dye on industrial scale and the used reactor construction.

The reactor consists of 12 reaction cells connected together of a filter press manner (Electro Prod-Cell, Electro-cell AB, Sweden). Each reaction cell is like in the example 1 a combination of spacers and gaskets. The cathodes consist of one nickel plate (with a surface of 3600 CM and one dragged bed of graphite granules (4000 g). The anode is a nickel plate (60×60 cm). A commercially-available Nafion membrane (Nafion 324, DuPont) is used two separate the two compartments.

In a tank of 200 liters, 20 kg of vat dye or sulfur dye are dispersed in 160 liters of water, which also contain 80 kg of caustic soda pellets 100% purity, in an another 60 liters tank are 50 liters of water containing 2 kg of caustic soda. This anolyte solution is maintained at pH 14 by addition of caustic soda. Catholyte and anolyte solutions flow through the cathode and the anode compartments, vertically from bottom to top, with a flow velocity of 150 l/min.

The dye suspension is reduced by application of a cathode potential of −1000 mV vs. Ag/AgCl in 3 M KCl solution. The catholyte and anolyte solutions are maintained at 50° C. These reducing conditions are maintained until complete reduction of the dye into the leuco dye.

The leuco dye can be introduced into special containers under nitrogen atmosphere and be dispatched to dye houses. Then the concentrated liquor can be introduced with a dosing pump in the dye bath. The system would be suitable for a discontinuous or continuous dyeing apparatus.

The example 3 describes a continuous production of leuco indigo for an industrial rope dyeing machine.

The electrochemical reactor is analogous to the reactor in example 2. The first step is a batch reduction of indigo in analogous manner of example 3. Next, when a 100 g/l leuco indigo solution is obtained in the catholyte tank, a 100 g/l indigo suspension is introduced into this tank by means of a dosing pump with a flow volume 2 l/min. The introduced indigo suspension contains 40 g/l caustic soda and has then the same composition as at the batch step of the reduction. In parallel fashion, a flow velocity of 2 l/min of the 100 g/l leuco indigo solution is dosed from the catholyte tank into a storage tank. The storage tank is used to supply a continuous rope dyeing machine.

The example 4 describes the use of the electrochemical reactor for the indirect electrolysis of sulfur dyes and the stabilization of the dye bath against reoxidation.

The electrochemical reactor described in example 1 is coupled to a laboratory dye-bath.

The composition of the dye bath for the reduction is 4 g/l NaOH, 0.5 g/l 9,10-anthraquinone-2-sulfonic acid-Na-salt and 1 g/l of C.I. sulfur black 1. At the beginning the dye bath is reduced by application of a cathode potential of −1000 mV vs. Ag/AgCl in 3 M KCl solution and a temperature of 50° C. The redox potential of the bath is raised to −500 mV and the dyestuff is entirely reduced. During the exhaustion of the reduced dyestuff, the dye bath potential is maintained at a fixed value by control of the cell current.

The example 5 describes the production of hydrogen peroxide by electroreduction of oxygen in alkaline electrolyte.

The electrochemical reactor is analogous to the reactor in example 1. As catholyte 2 liters of NaOH 1 M are used with continuous $O_2$ sparing at atmospheric pressure. Placed on the anolyte tank are 2 liters of NaOH 1 M. Catholyte and anolyte flow through the cathode and the anode compartment, vertically from bottom to top, with a flow velocity of 1 l/min.

A working current of 5 A is applied and after 12 h a solution of 2% $H_2O_2$ is obtained. This solution can be used to bleach the paper in a pulp industry. Hence, in the textile industry peroxide solutions manufactured with the reactor presented in example 1 or 2 can be used for bleaching of the cellulosic fibres or for reoxidation of leuco dyes.

The example 6 describes an application of the invention for the biotechnological industry: the regeneration of the enzyme cofactor NADH by the electrochemical reduction of the NAD+. The aim is to produce D-mannitol enzymatically from D-fructose. The mannitol dehydrogenase, which is the enzyme used for the production of D-mannitol, is NADH-dependant.

The same reactor as in 1 is used. Placed in the catholyte tank are 0.5 mM of NAD+, 100 mM de D-fructose, 1000 U/l of Mannitol dehydrogenase and 100 mM Na-formate in phosphate buffer (pH 7.0). Placed on the anode tank is 0.5 M phosphate buffer (pH 7.0). Electrochemical reduction of the dye suspension is obtained at 25° C. by application of a cathode potential of −1200 mV vs. Ag/AgCl in 3 M KCl solution. These conditions are maintained for 50 h, in order to completely convert the D-fructose into the D-mannitol.

Quantitative and Qualitative Comparison with Methods According to the State-of-the-Art:

In the following it shall be demonstrated that the reactor/method in accordance with the present invention is essentially different from the two processes and disclosed in GB 1239983 (in the following designated as D1) as well as U.S. Pat. No. 3,966,571 (in the following designated as D2).

To this end conditions in accordance with D1 and with D2 are compared with conditions according to the present invention.

Figure 6:
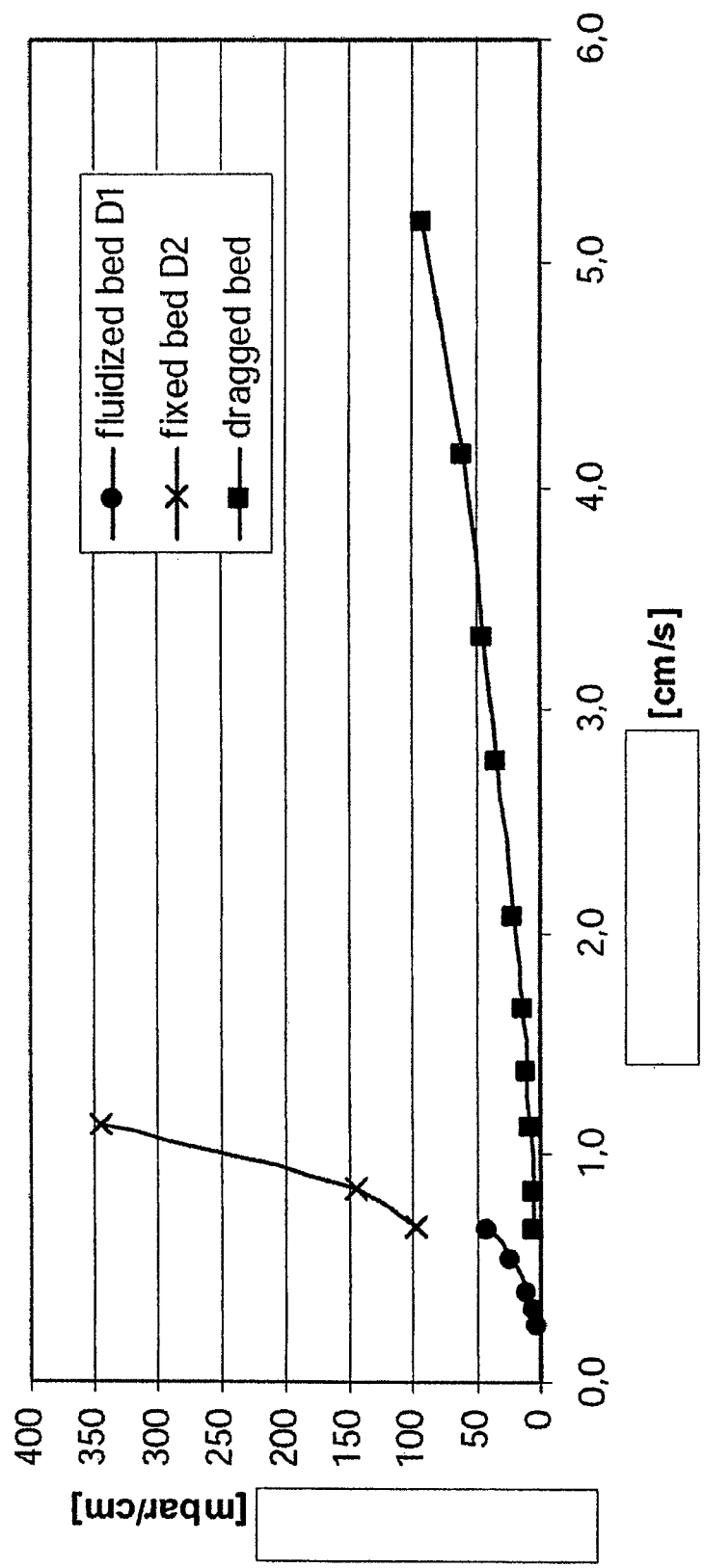

FIG. 6 shows in a comparative view the pressure loss in mbar/cm (y-axis) as a function of the fluid flow in cm/s (x-axis, $v_{mc}$). The conditions are given for particles with an average size of 0.4-0.5 mm (also in FIG. 7). As one can see, in the case of the fluidised bed according to D1 the flow cannot be increased above a value of approximately 0.7 cm/s, because above that the reactor would then not be in accordance with D1 anymore, the particles would then not be moving any more. As one can further see, in the case of the fixed bed in accordance with D2, due to the compact structure of the particles in this bed the pressure loss very quickly increases up to values of 350 mbar/cm already at a flow of as little as 1 cm/s.

This indicates that for the high flows necessary for an efficient electrochemical reaction, none of these two disclosures are suitable.

As one can furthermore see the dragged bed in accordance with the present invention due to the high porosity allows to increase the flow to values up to 6 cm/s while still having a low pressure loss across the dragged bed (always below 100 mbar/cm). This high flow of electrolyte fluid flow through the bed allows the unexpectedly high reaction rates according to the present invention.

Figure 7:
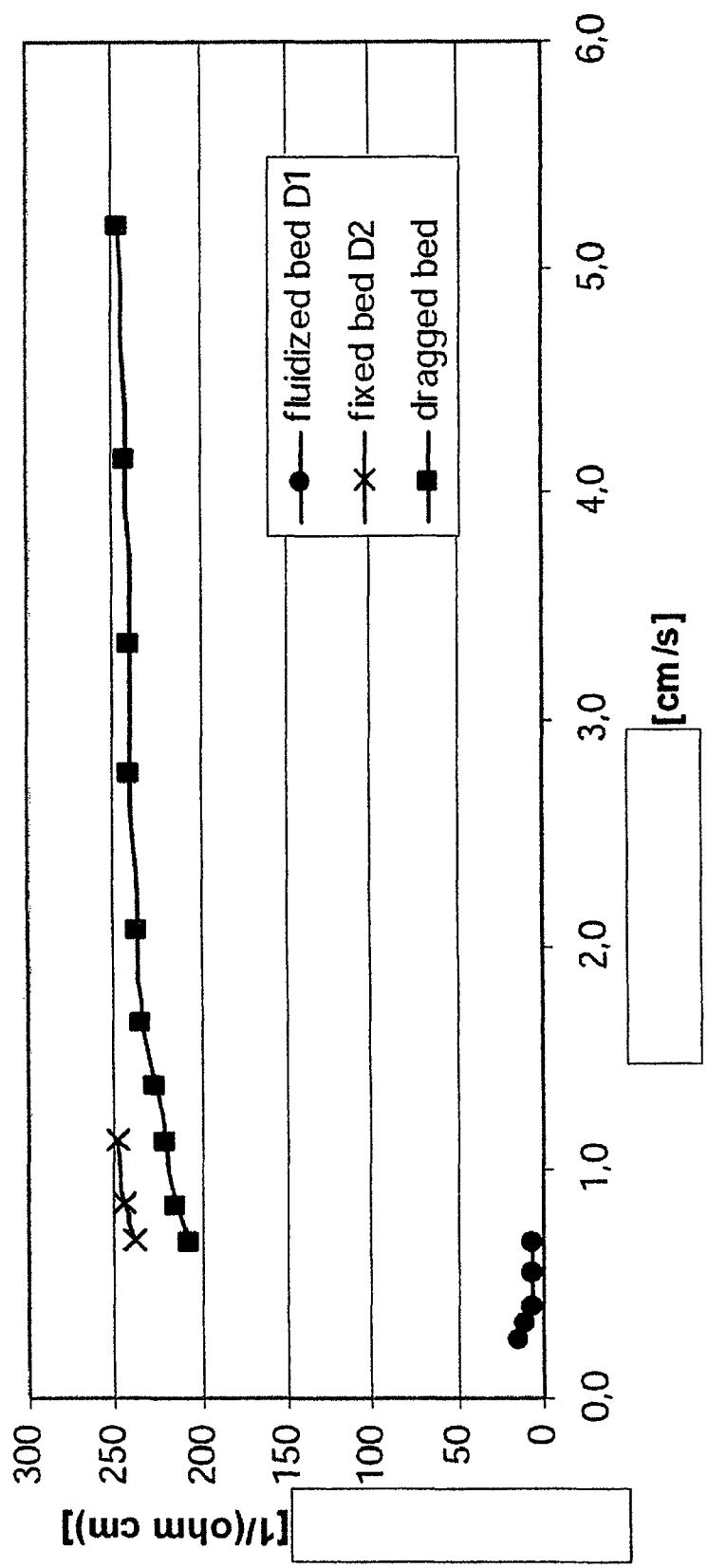

In a further test the conductivities of the different beds are compared in FIG. 7. In this case the conductivity in 1/(ohm.cm) (y-axis) is given as a function of the flow in cm/s (x-axis). As one can see, the fluidised bed in accordance with D1 inherently has an extremely low conductivity below 25. In principle the fixed bed in accordance with D2 would have a high conductivity e.g. at flow velocities in the range of 0.8-1.2 cm/s. However at these low flow velocities the reaction rates are simply too low for most applications.

In contrast to that as one can see from FIG. 7 the dragged bed in accordance to the present invention allows to have a high conductivity above 200 for the full range of flow velocities up to 6 cm/s.

LIST OF REFERENCE NUMERALS

1 electrochemical cell, electrochemical reactor
2 anodic compartment
3 cathodic compartment
4 anode plate
5 cathode plate
6 membrane
7 inlet anolyte
8 outlet anolyte
9 inlet catholyte
10 outlet catholyte
11 grid
12 current direction
13 stack of reactors with electrodes stacked together
14 granulate
15 fluidised bed, 0.32-0.16 mm
16 fixed bed, 1.41-1.00 mm
17 dragged bed, 0.32-0.16 mm
18 dragged bed, 0.50-0.40 mm
19 fixed bed, 4.00-2.00 mm
20 dyeing tank
21 container for protective atmosphere
22 tank for additives
23 tank for alkali solution/mediator
24 container for oxygen
25 first electrochemical reactor
26 second electrochemical reactor
27 tank for anolyte of first reactor
28 tank for catholyte of second reactor, suspension of colorant
29 tank for anolyte of second reactor
P valve

The invention claimed is:

1. An electrochemical reactor comprising:
   at least one liquid compartment, each having side walls, a top and a bottom, and an interior volume of said at least one compartment defining an inlet region and an outlet region;
   a multitude of freely suspended conductive granules enclosed within said at least one liquid compartment, and
   at least one pump unit for pumping liquids with an upstream flow,
   wherein at least one of the side walls of the compartment is an electrode and an opposite side wall is formed by a separator element,
   wherein there is provided a bottom inlet and a top outlet of the compartment for a liquid catholyte or a liquid anolyte,
   wherein the inlet region as well as the outlet region of the at least one compartment are provided with an upper grid and a lower grid, the width of each grid's mesh and the positioning of each grid is chosen such as to allow the liquid catholyte or the liquid anolyte to pass through from bottom to top but to prevent the granules from passing through the grids to leave the compartment,
   wherein an upstream flow of the liquid catholyte or of the liquid anolyte in operation causes the multitude of granules in a compartment to be dragged against the upper grid while the lower grid is substantially not in contact with the granules, thereby forming a dragged bed,
   wherein the granules have a size distribution full width at half height which is in the range of 50-100 micrometer,
   wherein there are no granules below or equal 50 micrometer in size,
   wherein the granules have a sphericity in the range of 0.6-0.8,
   wherein the upper and the lower grid both have a mesh width in the range of 50-150 micrometer,
   and wherein the dragged bed has a porosity in the range of 0.5-0.6.

2. The reactor according to claim 1, wherein the granules are selected from the group of:
   activated carbon, coke, metal particles, particles of a conducting polymer, graphite granules, or
   mixtures thereof, with or without a surface treatment.

3. The reactor according to claim 1, wherein the volume between the two grids is at least
   10% larger than the volume of the total of the multitude of granules enclosed by the two grids in dense packing.

4. The reactor according to claim 1, wherein the separator element is membrane or a grid,
   and wherein the distance between the electrode wall and the membrane wall of the compartment is in the range of 0.5-5 centimeter.

5. The reactor according to claim 1, wherein the compartment has a height of in the range of 10-100 cm.

6. The reactor according to claim 1, wherein both grids are electrically neutral.

7. The reactor according to claim 1, wherein the compartment is a cathodic or anodic
   compartment, and wherein one of the side walls is a cathode plate or an anode plate, respectively
   and the opposite side wall is a membrane to an adjacent anodic compartment or cathodic compartment, respectively.

8. An electrochemical reactor comprising
   at least two reactors according to claim 7 which are located adjacent to each other with alternating polarity such that adjacent side walls of adjacent units comprising a cathodic compartment and an anodic compartment are forming common electrode plates for adjacent units.

9. The reactor according to claim 1, wherein the granules have an average particle size diameter of more than 50 micrometer and less than or equal to 0.5 mm.

10. The reactor according to claim 1, wherein the granules have an average particle size diameter in the range of 200-500 micrometer.

11. The reactor according to claim 1, wherein the volume between the two grids is at least 40% larger than the volume of the total of the multitude of granules enclosed by the two grids in dense packing.

12. The reactor according to claim 1, wherein the separator element is membrane or a grid, and wherein the distance between the electrode wall and the membrane wall of the compartment is in the range of 0.5-1.5 centimeter.

13. The reactor according to claim 1, wherein the dragged bed has a porosity in the range of 0.50-0.55.

14. The electrochemical reactor as recited in claim 1,
    wherein the upstream velocity of the liquid catholyte or the liquid anolyte carrying the component is larger than a minimum fluid velocity ($v_m$) determined by the following equation:

$$v_m=[(\rho_s-\rho_f)gd_p^2]/\mu,$$

wherein $v_m$=minimum flow velocity, $\rho_s$=density of the granulate, $\rho_f$=density of the fluid, g=acceleration due to gravity, $d_p$=mean particle diameter, $\mu$=fluid viscosity.

15. The electrochemical reactor as recited in claim 1, wherein, said at least one pump unit is operative such that in a first step a fluid velocity of the electrolyte is increased up above the minimum flow in accordance with the Stokes equation but not more than twice the minimum of the Stokes equation at least until the freely suspended conductive granules are dragged against the upper grid, in a second step the flow velocity is increased to a minimum value of in the range of $$v_m=[(\rho_2-\rho_f)gd_p^2]/\mu,$$

and not up to a value of $$v_m<500\ \mu P/S^*(\rho_f)[10(1-\epsilon)/\epsilon^3]$$

wherein to this end the flow $v_{mc}$ given as $$v_{mc}=[\epsilon 8^3/\{10(1-\epsilon)\}]^*v_m$$

is increased by 0.001-0.05 cm/s per second; and
    after the actual electrolytic process is started, in a third step the variation in the flow velocity is kept low, such as to avoid a rearrangement of the dragged bed leading to a compacting of the dragged bed.

16. A method for the reduction or oxidation of a component in a reactor according to claim 1 in a continuous or quasi continuous process, wherein the upstream velocity of the liquid catholyte or the liquid anolyte carrying the component is chosen to be larger than a minimum fluid velocity ($v_m$) determined by the following equation:

$$v_m=[(\rho_s-\rho_f)gd_p^2]/\mu,$$

wherein $v_m$=minimum flow velocity, $\rho_s$=density of the granulate, $\rho_f$=density of the fluid, g=acceleration due to gravity, $d_p$=mean particle diameter, $\mu$=fluid viscosity.

17. The method according to claim 16, wherein the component is a vat dye and/or a sulphur dye in aqueous solution, a bleaching component or a mediator for oxidation.

18. The method according to claim 16, wherein the fluid velocity ($v_m$) is adjusted such as to have laminar flow at least in the region of the dragged bed.

19. The method according to claim 16, wherein the fluid velocity ($v_m$) is adjusted such as to have laminar flow at least in the region of the dragged bed, wherein this is achieved by choosing the fluid velocity to be $$v_m < 500\, \mu P/S^*(\rho_f)[10(1-\epsilon)/\epsilon^3].$$

20. A method for the production of a dragged bed in an electrochemical reactor according to claim 1 comprising at least one liquid compartment in which a multitude of freely suspended conductive granules is enclosed, wherein at least one of the side walls of the compartment is an electrode and an opposite side wall is formed by a separator element, wherein there is provided a bottom inlet and a top outlet of the compartment for a liquid catholyte or a liquid anolyte, wherein the inlet region as well as the outlet region of the compartment are provided with an upper grid and a lower grid, the width of the mesh and the positioning of which is chosen such as to allow the liquid catholyte or the liquid anolyte to pass through from bottom to top but to prevent the granules to pass through the grids to leave the compartment, and wherein the upstream flow of the liquid catholyte or of the liquid anolyte can be adjusted so that in operation the multitude of granules is dragged against the upper grid while the lower grid is substantially not in contact with the granules, wherein in a first step the fluid velocity of the electrolyte is increased up above the minimum flow in accordance with the Stokes equation but not more than twice the minimum of the Stokes equation at least until the freely suspended conductive granules are dragged against the upper grid;

in a second step the flow velocity is increased to a minimum value of in the range of $$v_m = [(\rho_s - \rho_f) g d_p^2]/\mu,$$

and not up to a value of $$v_m < 500\, \mu P/S^*(\rho_f)[10(1-\epsilon)/\epsilon^3]$$

wherein to this end the flow $v_{mc}$ given as $$v_{mc} = [\epsilon^3/\{10(1-\epsilon)\}]^* v_m$$

is increased by 0.001-0.05 cm/s per second;

in a third step the actual electrolytic process is started, wherein the variation in the flow velocity is kept low, such as to avoid a rearrangement of the dragged bed leading to a compacting of the dragged bed.

21. A method for operating a reactor according to claim 1 for vat and/or sulphur dye dyeing of fibres, yarns and/or textiles wherein the reactor is used for the reduction of the dye and/or for the preparation of a bleaching agent and/or for oxidation of the dye after its application to the fibres, yarns and/or textiles.

22. A method for the production of a dragged bed in an electrochemical reactor according to claim 1 comprising at least one liquid compartment in which a multitude of freely suspended conductive granules is enclosed, wherein at least one of the side walls of the compartment is an electrode and an opposite side wall is formed by a separator element, wherein there is provided a bottom inlet and a top outlet of the compartment for a liquid catholyte or a liquid anolyte, wherein the inlet region as well as the outlet region of the compartment are provided with an upper grid and a lower grid, the width of the mesh and the positioning of which is chosen such as to allow the liquid catholyte or the liquid anolyte to pass through from bottom to top but to prevent the granules to pass through the grids to leave the compartment, and wherein the upstream flow of the liquid catholyte or of the liquid anolyte can be adjusted so that in operation the multitude of granules is dragged against the upper grid while the lower grid is substantially not in contact with the granules, wherein in a first step the fluid velocity of the electrolyte is increased up above the minimum flow in accordance with the Stokes equation but not more than twice the minimum of the Stokes equation at least until the freely suspended conductive granules are dragged against the upper grid;

in a second step the flow velocity is increased to a minimum value of in the range of $$v_m = [(\rho_s - \rho_f) g d_p^2]/\mu,$$

and not up to a value of $$v_m < 500\, \mu P/S^*(\rho_f)[10(1-\epsilon)/\epsilon^3]$$

wherein to this end the flow $v_{mc}$ given as $$v_{mc} = [\epsilon^3/\{10(1-\epsilon)\}]^* v_m$$

is increased by 0.005-0.02 cm/s per second;

in a third step the actual electrolytic process is started, wherein the variation in the flow velocity is kept low, such as to avoid a rearrangement of the dragged bed leading to a compacting of the dragged bed.

23. A method for operating a reactor according to claim 1 for vat and/or sulphur dye dyeing of fibres, yarns and/or textiles wherein the reactor is used for the reduction of the dye and/or for the preparation of a bleaching agent and/or for oxidation of the dye after its application to the fibres, yarns and/or textiles, wherein two distinct reactors are used, one for the preparation of a bleaching agent and for the oxidation of the dye after its application to the fibres, and a second one for the reduction of the dye.

* * * * *